Sept. 3, 1968 A. J. JORGENSEN ETAL 3,400,385

ELECTRICAL TACHOMETER CIRCUIT HAVING DIGITAL OUTPUT

Filed July 13, 1964

United States Patent Office 3,400,385
Patented Sept. 3, 1968

3,400,385
ELECTRICAL TACHOMETER CIRCUIT HAVING DIGITAL OUTPUT

Arnold J. Jorgensen, Duarte, and Lorrin O. Anderson, Covina, Calif., assignors to Burroughs Corporation, Detroit, Mich., a corporation of Michigan
Filed July 13, 1964, Ser. No. 382,323
7 Claims. (Cl. 340—174.1)

ABSTRACT OF THE DISCLOSURE

Electrical pulses are generated at intervals of time equal to the period of a rotating disk. A flip-flop having first and second stable states is triggered to assume its first state when the interval between generated pulses is less than a predetermined first time duration representing the nominal operating speed of the rotating disk. The flip-flop is triggered to assume its second state when the interval between the generated pulses exceeds a larger time duration representing the lowest acceptable operating speed of the rotating disk. The flip-flop can serve to control the movement of a magnetic transducer head into and out of proximity with the disk.

This invention relates in general to speed determining circuits, and more particularly to an electrical tachometer circuit for delivering an output when a measured device reaches a predetermined speed, and for thereafter automatically maintaining that output if the speed of the measured device drops off within a fixed limit, and for automatically removing that output when the speed drops below a lowest acceptable limit.

This invention while not limited thereto, finds special application as a tachometer circuit for magnetic memory elements such as magnetic disks and drums and their cooperating read-write heads. An electrical operating speed sensing circuit employed in a magnetic disk system is described in a patent application having Ser. No. 257,146 filed Feb. 8, 1963, now U.S. Patent No. 3,329,943, by Lewis L. Tanguy Jr., and Arthur G. Barnett, and assigned to the same assignee as the present invention, which matured into Patent No. 3,329,943 on July 4, 1967. In the apparatus disclosed in this patent, a manually controlled operation must take place in order to move information read-write heads into position adjacent a rotating magnetic memory disk. This manual operation takes place only after a predetermined operating speed had been reached for the disk. This manual operation is unsatisfactory because it requires that an operator monitor the speed of the rotating disk, and at the proper speed, manually initiate a vital part of the magnetic memory system operation.

Furthermore, the sensing circuit of the above-mentioned application exhibits a one-way operation in that it is operative only to provide an output signal when the speed of the measured device falls below a predetermined value. This prior art approach is thus expensive and wastes considerable time, as it requires an operator-controlled initiation, and provides only a one-way operation. Both of these shortcomings are overcome by the automatic operation of the present invention which initiates an output at proper speeds and automatically removes that output when the rotation speed drops below a safe operating point.

Another disadvantage of the sensing circuit mentioned above is that any small variation below the predetermined operating speed would retract the heads, and require a manual reset even though the speed reduction was immediately compensated for. Any automatic reset operation would result in "jitter" or an on-off-on signal to the head retract mechanism with resulting information losses caused by fluctuations in the head to disk spacing.

The tachometer circuit of this invention provides a first constant output indication when the highest predetermined operating speed is reached, and maintains this output without any jitter until the speed drops below the lowest acceptable rotation speed at which time the output is automatically removed. Further, the electrical tachometer circuit of this invention achieves this improved operation in a simple and straightforward manner which involves less circuit components than the above-mentioned prior art sensing circuit.

In the electrical tachometer circuit of this invention a bistable circuit is set normally in a first state indicating that the rotating device being monitored has not achieved a predetermined initial operating speed. Clock pulses which are synchronized with the rotation speed are applied both to the bistable circuit and a delay circuit which has a delay time that is equal to the time between the periodic pulses when the rotating device achieves its predetermined highest speed. When the rotating device reaches this predetermined highest speed, the time between appearance of the periodic rotating speed clock pulses and the delay time are equal, and the coincidence of these signals applied to the bistable circuit changes its state. The bistable circuit thereafter delivers an output signal to a utilization means, e.g., head control solenoid for moving the information read-write head into operational position adjacent the rotating device. The same output signal from the first delay circuit which sets the bistable circuit is applied to a second and tandem-connected delay circuit and also is inverted and applied to a gating means. This second delay circuit has a delay time which represents an operational speed range in that it prevents any change in the digital output of the bistable device for limited reductions of the rotating speed of the monitored device below the predetermined highest level. The output from this second delay circuit is also inverted and applied to the gating means which represents a coincidence detector having an output terminal connected to the other input of the above-mentioned bistable circuit. Connected in this fashion the bistable circuit cannot respond at all during the second delay period, and can return to its original state, indicative of a rotating speed less than the operational limit, only if the time between appearance of two successive clock signals is greater than the combined time delay for both tandem-connected delay circuits.

The invention is described in more detail by reference to the accompanying drawing in which.

Figure 1:
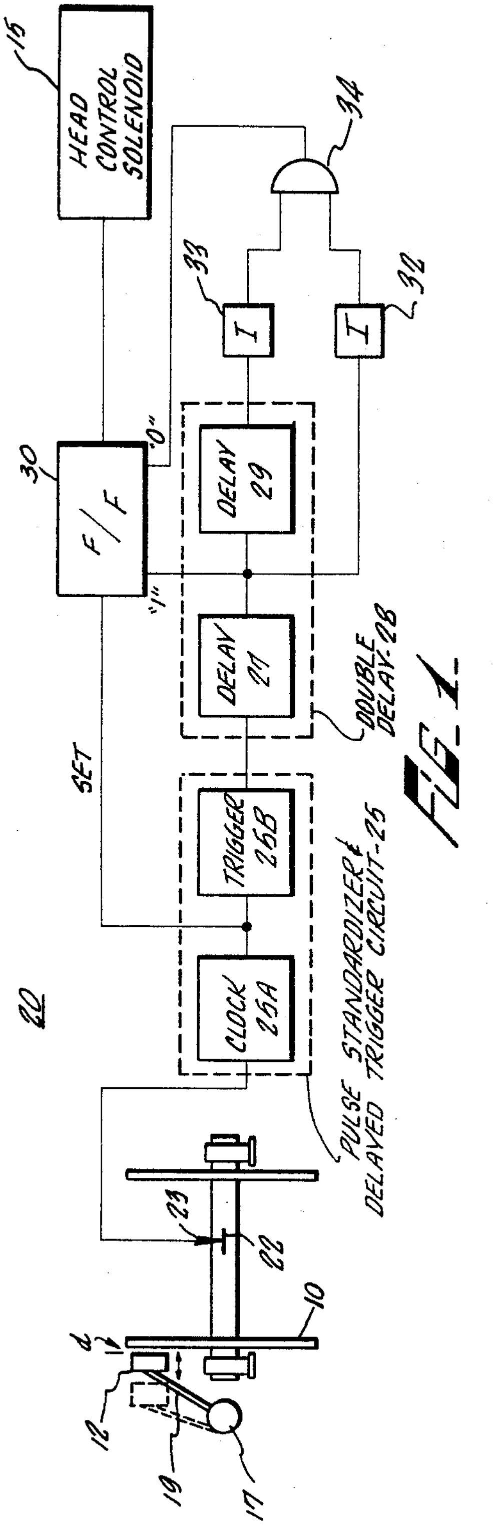
FIG. 1 is a block diagram of an electrical tachometer circuit including the principles of the present invention.

A general description of the illustrated embodiment of this invention is made by reference to the block diagram in FIG. 1, in which a rotatable disk memory 10 and a read-write head 12 are shown in a separated relation which is representative of their normal operating condition. In this condition a head to disk gap *d*, which may for example be of the order of 100 micro-inches is present. The information read-write head 12 and the disk memory 10 may be of the kind disclosed in a copending patent application of S. A. Billawala, having Ser. No. 286,374, filed June 7, 1963, now U.S. Patent No. 3,320,599, and assigned to the same assignee as the present invention, which matured into U.S. Patent No. 3,320,599 on May 16, 1967. As described in that application, there is only a slight possibility of physical contact between the head and disk. However, this present invention diminishes that possibility by automatically assuring that the heads are never released to move into position next to the disk until the proper and desired rotation speed of the disk is obtained. Once that speed has been reached, and the heads have been "flown" or positioned on the air bearing *d* adjacent to the disk, there is a permissible speed reduction during which the air bearing is present and assures that there is no contact between the heads and the disk. During these reductions in speed it is essential that the tachometer circuit hold its output level without variation until the disk speed drops below a predetermined lower limit which could possibly cause damage to the disk and the flying heads. At this lower speed the tachometer circuit of this invention activates the head control solenoid 15 to assure immediate separation between the head and the disk.

Head control solenoid 15, which is connected to the output of the tachometer circuit of this invention, normally holds the solenoid valve 17 in an open position which permits airflow through conduit 19 to hold head 12 in a retracted position, shown in dashed lines in FIG. 1. When the proper rotating speed is attained, tachometer circuit 20 automatically pulses the head control solenoid 15 in order to close valve 17, and thus position the head 12 on an air bearing adjacent to disk 10. Head 12 will retain this "flown" position even if the disk speed drops below the initial operational speed provided that the disk speed does not drop below a critical lower speed. If this critical lower limit speed does occur, the tachometer 20 automatically returns the head control solenoid 15 to its normal condition thus moving head 12 away from disk 10 by the operation described below.

Figure 2:
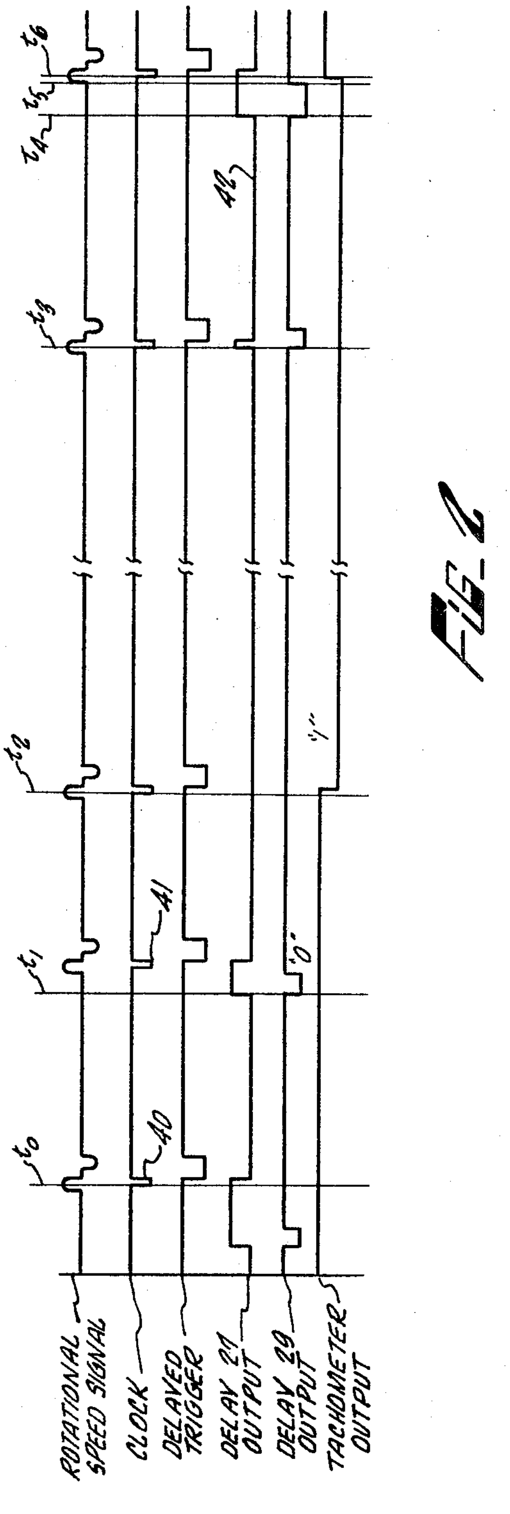
FIG. 2 is a pulse waveform chart useful in promoting a full understanding of the operation of the circuitry of FIG. 1.

Tachometer circuit 20 receives one input pulse for each rotation of the disk 10. One means for obtaining such a pulse may take the form of a small permanent magnet 22, and magnetic sensing head 23. These pulses during rotation of the disk 10 will, of course, vary in repetitive frequency dependent upon the rotation speed. Such pulses are shown in FIG. 2, wherein they are spaced relatively close to each other during high speeds, and are spaced further apart during slower rotating speds.

These rotation speed signals are applied to a pulse standardizer and delayed trigger circuit 25. The pulse standardizer portion of circuit 25 comprises a clock 25A which amplifies and reshapes each rotational speed signal in any manner well known to the prior art. The clock pulses produced by circiut 25A are shown in FIG. 2, which pulses are utilized to set flip-flop circuit 30 in either a "zero" or "one" state depending upon the signal inputs to the flip-flop from the double delay circuit 28.

For each output from clock circuit 25A the trigger circuit 25B is activated at the trailing edge of the clock pulse. Trigger circuit 25B may also be of any suitable type well known to the prior art. Trigger circuit 25B is necesasry to assure that an output from clock 25A cannot activate the first delay circuit and the set lead of flip-flop 30 simultaneously, and thus establish the possibility that the flip-flop 30 would be set to "one" even though a time delay operation had not taken place, or that the rotational device is not up to operational speed. Further, this circuit provides sufficient energy to activate the delay circuits. The output from delay trigger circuit 25B may adavntageously be in the order of three milliseconds, whereas the clock signal is in the order of three microseconds. Thus the delay trigger circuit 25B generates a signal of sufficient duration to assure activation of the first multivibrator delay timing circuit 27.

An output from the delay trigger circuit 25B activates the timing cycle for the delay multivibrator circuit 27 which has a time delay that is equal to the time between appearances of the rotation speed signals when the disk is rotating at predetermined operating speed. This delay time in the circuit of FIG. 1, may advantageously be, for example, 45 milliseconds, which time represents a rotational speed of 1330 r.p.m. for disk 10. Outputs from the first delay multivibrator 27 are shown in FIG. 2. As is clear from time interval $t_0$ to $t_1$, of FIG. 2, if the delay time of delay circuit 27 is less than the time between the clock pulses 40 and 41, then flip-flop 30 will have a "0" output as its normal condition. However, as the rotational speed of the disk increases, the clock pulses will steadily increase in frequency until at time $t_2$, FIG. 2, the delay circuit 27 produces an input on the "one" lead for flip-flop 30 at the same time that clock signal is applied to flip-flop 30. When this condition occurs the flip-flop circuit 30 is set in a "one" state and thereby a control voltage is applied to the head solenoid circuit 15. Circuit 15 in trun actuates valve 17, and moves heads 12 into a read or write position.

Further, as shown in FIG. 2, once the delay time of delay circuit 27 is equaled or exceeded by the rotational time, or time between repetitive input signals, flip-flop 30 thereafter holds its "one" state. During this time in which the output of flip-flop 30 is "true," the head control solenoid 15, and valve devices 17 and 19, maintain head 12 in an operational position adjacent disk 10.

The circuit operation involved when the rotational speed of disk 10 drops below the original predetermined operating speed, and reaches a critical lower limit, is better understood by reference to the pulse waveforms at time $t_3$ of FIG. 2.

At time $t_3$ the rotational speed of disk 10 has decreased to such an extent that the delay multivibrator 27, FIG. 1, times out. The second time delay circuit 29, which may also advantageously be a delay multivibrator, is activated by the trailing edge of the output from delay circuit 27. At time $t_3$ an inverted output is applied to AND gate 34 by circuit 32 which inverts the output from delay circuit 27. Coincidence at AND gate 34 however cannot be established at time $t_3$ because delay circuit 29 is triggered by the output from delay circuit 27, and is thus in an opposite conductive condition from delay circuit 27. It is clear that when delay circuit 29 is active its output signal, which is inverted by circuit 33, prevents any coincidence at AND gate 34. The active period for delay circuit 29 is never simultaneous with an active period in delay circuit 27, and thus the time interval of the active period for delay circuit 29 defines a time during which it is impossible for flip-flop 30 to change its state. Accordingly, during this active interval for delay circuit 29, the flip-flop circuit 30 cannot be set to a "zero" state. With delay circuit 29 connected to flip-flop 30 in this manner, the flip-flop 30 cannot respond at all during the second delay period, but instead will hold its condition previously established. Only when the rotational speed is slower than the combined time delay for both delay circuits 27 and 29 will both of their inverted outputs satisfy the logic conditions of gate 34 and permit a change in state for flip-flop 30. Thus an operational range of rotational speed is provided in a manner which removes any variation in an output signal until the rotational speed has dropped below the slowest critical speed, at which time the output signal is removed.

Flip-flop 30 will assume a "zero" state when both time delay circuits 27 and 29 are inactive. The pulse waveforms at time $t_4$, $t_5$ and $t_6$ illustrate the operation of the circuit of FIG. 1, when the speed of disk 10 has dropped below the combined time delays of both circuits 27 and 29. At time $t_4$ delay circuit 27 times out, and the trailing edge of output pulse 42 initiates an active interval in delay circuit 29. The output pulse 43 of delay circuit 29 ends at time $t_5$, and thereafter the output from delay circuit 27 and the output from delay circuit 29 are the same polarity. Both outputs are inverted by circuits 32 and 33, and establish coincident signals at AND gate 34. Coincident detector gate 34, in response to this coincidence, applies a "zero" signal to flip-flop 30. Thus at time $t_6$ when the next clock or set signal is produced by clock circuit 25A, flip-flop 30 is set in a "zero" state.

This "zero" state in flip-flop 30 activates head control solenoid 15 and its associated valve combination 17 and 19 to immediately retract head 12 from its operational position adjacent disk 10. Thus the circuit of this invention automatically places the head 12 in its operational position and automatically retracts that head by an operation which is free of any jitter and free also from any manual operations.

Although FIG. 1, depicts a magnetic slug 22 on a rotating shaft, it should be understood that any member having a repetitive motion could be monitored by the tachometer circuit of this invention. For example, the magnetic slug 22 could be mounted on a member having a reciprocating or other similar movement, and the principles of this invention would provide a digital tachometer which would automatically provide an electrical signal indicative of a safe operational speed. Also, it should be clear that this invention provides a circuit for automatically signalling any predetermined frequency range of repetitive signals and is not limited by the magnetic sensing devices of FIG. 1.

It is to be understood that the above-described arrangements are illustrative of the principles of this invention. Numerous other arrangements may be devised by those skilled in the art without departing from the spirit and scope of this invention.

What is claimed is:

1. An electrical tachometer circuit for a periodically moving member comprising:

- means for generating electrical pulses having a characteristic proportional to the period of the movement of the member;
- a bistable device having first and second inputs, the device assuming a first state upon the actuation of the first input and assuming a second state upon the actuation of the second input;
- means for actuating the first input when the characteristic of the generated pulses indicates that the period of the member is less than a predetermined first time duration; and
- means for actuating the second input when the characteristic of the generated pulses indicates that the period of the member exceeds a predetermined second time duration different from the first time duration.

2. The tachometer circuit of claim 1, in which the characteristic is the interval between pulses.

3. The tachometer circuit of claim 2, in which the first time duration is smaller than the second time duration.

4. The tachometer circuit of claim 3, in which the means for actuating the first input comprises means for delaying the generated pulses a time duration proportional to a predetermined period of the member and coupling the delayed pulses to the first input and the state of the bistable device is only changed when one of its inputs is actuated coincident with the undelayed generated pulses.

5. The tachometer circuit of claim 4, in which the means for actuating the second input comprises means for delaying the delayed generated pulses an additional time duration and coupling the additionally delayed pulses to the second input.

6. The tachometer circuit of claim 1, in which the member is a rotatable magnetic storage device having a magnetic transducer head, means for moving the head into proximity with the member when the bistable device is in the first state, and means for moving the head out of proximity with the member when the bistable device is in the second state.

7. An electrical tachometer circuit for a rotatable member comprising pulse generating means synchronized to provide pulses with a period related to the speed of rotation of said member, a first delay circuit triggered into a first state by said pulses for a time interval equal to the pulse period at a first predetermined speed of said member, a control circuit capable of assuming either a first or a second state, means responsive to the coincidence of a generated pulse and the first state of the first delay circuit for putting the control circuit in the first state, a second delay circuit triggered into a first state for an additional time interval by the change of the first delay circuit out of the first state and means responsive to the coincidence of a generated pulse and the first and second delay circuits being out of the first state for putting the control circuit in the second state.

References Cited

UNITED STATES PATENTS

| | | | |
|---|---|---|---|
| 2,968,803 | 1/1961 | Lindley | 340—271 |
| 3,172,091 | 3/1965 | Friend | 340—174.1 |

BERNARD KONICK, *Primary Examiner.*

B. HALEY, *Assistant Examiner.*